(12) United States Patent
Hirano et al.

(10) Patent No.: US 11,065,693 B2
(45) Date of Patent: Jul. 20, 2021

(54) CUTTING TOOL SHIM AND CUTTING TOOL

(71) Applicant: Sumitomo Electric Hardmetal Corp., Itami (JP)

(72) Inventors: Tsutomu Hirano, Itami (JP); Satoru Kukino, Itami (JP); Tomoyuki Fukuyama, Itami (JP); Takuma Kishimoto, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 16/326,671

(22) PCT Filed: Jul. 31, 2017

(86) PCT No.: PCT/JP2017/027630
§ 371 (c)(1),
(2) Date: Feb. 19, 2019

(87) PCT Pub. No.: WO2018/034133
PCT Pub. Date: Feb. 22, 2018

(65) Prior Publication Data
US 2019/0184469 A1  Jun. 20, 2019

(30) Foreign Application Priority Data
Aug. 19, 2016 (JP) .............................. JP2016-161273

(51) Int. Cl.
*B23B 27/10* (2006.01)
*B23B 27/16* (2006.01)

(52) U.S. Cl.
CPC .......... *B23B 27/1618* (2013.01); *B23B 27/10* (2013.01); *B23B 2205/16* (2013.01); *B23B 2250/12* (2013.01)

(58) Field of Classification Search
CPC . B23B 2205/16; B23B 2250/12; B23B 27/10; B23B 27/1618; B23B 27/16;
(Continued)

(56) References Cited

U.S. PATENT DOCUMENTS 3,486,378 A * 12/1969 Carlson ..................... G01J 5/60
374/127
3,889,520 A * 6/1975 Stoferle ............. B23Q 17/0957
73/37.5
(Continued)

FOREIGN PATENT DOCUMENTS

CN 105081376 A 11/2015
EP 2946857 A1 11/2015
(Continued)

*Primary Examiner* — Sara Addisu
(74) *Attorney, Agent, or Firm* — Baker Botts L.L.P.; Michael A. Sartori (57) ABSTRACT

A cutting tool shim is to be disposed between a cutting insert and a holder and to be fixed to the holder. The ridgeline between the flank face and the rake face forms a cutting edge. The cutting edge includes an arc-shaped portion. A coolant supply path for jetting coolant to the arc-shaped portion is provided in the cutting tool shim, the coolant being supplied from the holder. The coolant supply path includes a lead-in port for leading the coolant from the holder to the coolant supply path, and a jetting port for arc-shaped portion for jetting the coolant to the arc-shaped portion. The jetting port for arc-shaped portion has a curved shape along the arc-shaped portion. The distance between the jetting port for arc-shaped portion and the arc-shaped portion is not less than 2.2 mm and not more than 8.1 mm.

12 Claims, 8 Drawing Sheets

(58) Field of Classification Search
CPC . B23B 27/1622; Y10T 407/14; Y10T 407/23; B23Q 11/10
See application file for complete search history.

(56) References Cited

U.S. PATENT DOCUMENTS

| | | | | |
|---|---|---|---|---|
| 4,535,216 | A * | 8/1985 | Cassidenti | B23B 27/10 219/68 |
| 5,439,327 | A * | 8/1995 | Wertheim | B23B 27/045 407/11 |
| 7,802,947 | B2 * | 9/2010 | Endres | B23B 27/145 407/113 |
| 8,007,208 | B2 * | 8/2011 | Noureddine | B23B 27/1614 407/47 |
| 8,137,034 | B2 * | 3/2012 | Noureddine | B23B 29/04 407/11 |
| 10,307,827 | B2 * | 6/2019 | Imai | B23Q 11/10 |
| 10,710,166 | B2 * | 7/2020 | Nagae | B23B 27/10 |
| 2008/0175678 | A1 | 7/2008 | Prichard et al. | |
| 2010/0254772 | A1 * | 10/2010 | Rozzi | B23B 27/10 407/11 |
| 2011/0020073 | A1 * | 1/2011 | Chen | B23B 27/164 407/11 |
| 2011/0299944 | A1 * | 12/2011 | Hofermann | B23B 27/1614 407/11 |
| 2012/0082518 | A1 * | 4/2012 | Woodruff | B23C 5/207 407/11 |
| 2012/0087746 | A1 * | 4/2012 | Fang | B23B 27/10 407/11 |
| 2013/0251463 | A1 * | 9/2013 | Harif | B23B 27/04 407/11 |
| 2015/0328688 | A1 * | 11/2015 | Johansson | B23B 27/1622 407/11 |
| 2016/0368061 | A1 * | 12/2016 | Harif | B23C 5/207 |
| 2017/0368612 | A1 * | 12/2017 | Imai | B23Q 11/10 |
| 2020/0215618 | A1 * | 7/2020 | Hirano | B23P 15/28 |

FOREIGN PATENT DOCUMENTS

| | | | | |
|---|---|---|---|---|
| JP | 56069007 | A * | 6/1981 | ............ B23B 27/10 |
| JP | S63-151203 | U | 10/1988 | |
| JP | 04183503 | A * | 6/1992 | |
| JP | H05-016012 | A | 1/1993 | |
| JP | H06-65693 | A | 3/1994 | |
| JP | H10-076404 | A | 3/1998 | |
| JP | 2001287134 | A * | 10/2001 | |
| JP | 2005-154847 | A | 6/2005 | |
| JP | 3139545 | U | 2/2008 | |
| JP | 2011-189505 | A | 9/2011 | |
| JP | 2013-146819 | A | 8/2013 | |
| JP | 2015-131387 | A | 7/2015 | |
| JP | 2015-217512 | A | 12/2015 | |
| JP | 2015-217514 | A | 12/2015 | |
| JP | 2016-135524 | A | 7/2016 | |
| JP | 2016-161273 | A | 9/2016 | |
| WO | WO-2004050314 | A2 * | 6/2004 | .......... B23B 27/145 |
| WO | 2008/088627 | A1 | 7/2008 | |

* cited by examiner

CUTTING TOOL SHIM AND CUTTING TOOL

TECHNICAL FIELD

The present invention relates to a cutting tool shim and a cutting tool. The present application claims a priority based on Japanese Patent Application No. 2016-161273 filed on Aug. 19, 2016, the entire contents of which are incorporated herein by reference.

BACKGROUND ART

Japanese Patent Laying-Open No. 2015-217512 (PTL 1) and Japanese Patent Laying-Open No. 2015-217514 (PTL 2) disclose a cutting tool having a shim disposed between a cutting insert and a holder. The shim has a jetting port for supplying coolant to the cutting edge of the cutting insert.

If a cutting tool shim has a coolant jetting port, the coolant jetting direction can be adjusted by replacing the shim. For each of a plurality of cutting inserts having differently shaped cutting edges, its corresponding shim can be used, with the holder being common. Further, if a shim has a coolant jetting port, the jetting port can be brought closer to the cutting edge. This allows accurate supply of coolant to the cutting edge.

CITATION LIST

Patent Literature

[PTL 1] Japanese Patent Laying-Open No. 2015-217512
[PTL 2] Japanese Patent Laying-Open No. 2015-217514

SUMMARY OF INVENTION

A cutting tool shim according to one aspect of the present invention is a cutting tool shim to be disposed between a cutting insert and a holder and to be fixed to the holder. The cutting insert includes a flank face and a rake face continuous with the flank face. The ridgeline between the flank face and the rake face forms a cutting edge. The cutting edge includes an arc-shaped portion. A coolant supply path for jetting coolant to the arc-shaped portion is provided in the cutting tool shim, the coolant being supplied from the holder. The coolant supply path includes a lead-in port for leading the coolant from the holder to the coolant supply path, and a jetting port for arc-shaped portion for jetting the coolant to the arc-shaped portion. The jetting port for arc-shaped portion has a curved shape along the arc-shaped portion. The distance between the jetting port for arc-shaped portion and the arc-shaped portion is not less than 2.2 mm and not more than 8.1 mm.

EMBODIMENTS OF THE INVENTION

Problem to be Solved by the Present Disclosure

When a jetting port provided in a shim is bought close to a cutting edge, coolant is accurately supplied to the cutting edge but cannot diffuse so widely. Accordingly, the coolant is locally jetted to the cutting edge. In other words, some parts of the cutting edge are not supplied with sufficient coolant. Local wear progresses at the parts of the cutting edge that are not supplied with sufficient coolant. In particular, at a portion around the boundary between an arc-shaped portion of the cutting edge and a linear portion continuous with the arc-shaped portion, flank face wear called boundary wear occurs. In the cutting tools disclosed in Japanese Patent Laying-Open No. 2015-217512 and Japanese Patent Laying-Open No. 2015-217514, the portion around the boundary cannot be supplied with sufficient coolant. Therefore, it is difficult to reduce boundary wear.

An object of one aspect of the present invention, which has been made in view of the above problem, is to provide a cutting tool shim and a cutting tool that can reduce boundary wear.

Advantageous Effect of the Present Disclosure

One aspect of the present invention can provide a cutting tool shim and a cutting tool that can reduce boundary wear.

SUMMARY OF EMBODIMENTS OF THE INVENTION

First, the summary of embodiments of the present invention is described (1) A cutting tool shim 10 according to one aspect of the present invention is cutting tool shim 10 to be disposed between a cutting insert 20 and a holder 30 and to be fixed to holder 30. Cutting insert 20 includes a flank face 21 and a rake face 22 continuous with flank face 21. The ridgeline between flank face 21 and rake face 22 forms a cutting edge 2. Cutting edge 2 includes an arc-shaped portion 2a. A coolant supply path 1 for jetting coolant to arc-shaped portion 2a is provided in cutting tool shim 10, the coolant being supplied from holder 30. Coolant supply path 1 includes a lead-in port 9 for leading the coolant from holder 30 to coolant supply path 1, and a jetting port 3 for arc-shaped portion for jetting the coolant to arc-shaped portion 2a. Jetting port 3 for arc-shaped portion has a curved shape along arc-shaped portion 2a. The distance between jetting port 3 for arc-shaped portion and arc-shaped portion 2a is not less than 2.2 mm and not more than 8.1 mm.

Cutting tool shim 10 according to the above (1) includes jetting port 3 for arc-shaped portion for jetting coolant to arc-shaped portion 2a of cutting edge 2. Jetting port 3 for arc-shaped portion has a curved shape along arc-shaped portion 2a. This allows coolant to jet to arc-shaped portion 2a in the shape of layer (in the shape of curtain). Thus, coolant can be supplied over a wide region of arc-shaped portion 2a. As a result, occurrence of local wear of the cutting edge can be reduced. In particular, coolant is effectively supplied to a portion around the boundary between arc-shaped portion 2a and linear portion 2b continuous with arc-shaped portion 2a. Accordingly, boundary wear around the boundary in the flank face can be reduced.

(2) In cutting tool shim 10 according to the above (1), jetting port 3 for arc-shaped portion may include an outer circumference arc 3a provided along arc-shaped portion 2a, and an inner circumference arc 3b separated from outer circumference arc 3a and provided along arc-shaped portion 2a. Thus, coolant can be supplied over a wide region of arc-shaped portion 2a.

(3) In cutting tool shim 10 according to the above (1), jetting port 3 for arc-shaped portion may be formed by a plurality of slits 3d provided along any of the same shape as the shape of arc-shaped portion 2a and a shape similar to the shape of arc-shaped portion 2a. Thus, coolant can be supplied over a wide region of arc-shaped portion 2a.

(4) In cutting tool shim 10 according to any of the above (1) to (3), cutting tool shim 10 may include a top surface 11 on which cutting insert 20 is to be mounted. Top surface 11 may include a contact portion 11a to come into contact with cutting insert 20, and a protruding portion 11b continuous with contact portion 11a and separated from cutting insert 20. Jetting port 3 for arc-shaped portion may be open at protruding portion 11b. Thus, coolant can be effectively supplied to arc-shaped portion 2a.

(5) In cutting tool shim 10 according to any of the above (1) to (4), cutting edge 2 may further include a linear portion 2b continuous with arc-shaped portion 2a. Coolant supply path 1 may further include a jetting port 4b for linear portion for jetting the coolant to linear portion 2b. Thus, coolant can be supplied to linear portion 2b, and also to a portion around the boundary between arc-shaped portion 2a and linear portion 2b. This can reduce wear in linear portion 2b and can also reduce boundary wear.

(6) In cutting tool shim 10 according to any of the above (1) to (5), cutting tool shim 10 may have a density of not less than 99.0% and not more than 99.9%. Pores provided in cutting tool shim 10 can reduce vibrations during cutting.

(7) In cutting tool shim 10 according to any of the above (1) to (6), the material that constitutes cutting tool shim 10 may have a Rockwell hardness of not less than 20 and not more than 60. A Rockwell hardness of not less than 20 can prevent a decrease in durability. A Rockwell hardness of not more than 60 can prevent deterioration in vibration damping properties.

(8) In cutting tool shim 10 according to any of the above (1) to (7), the material that constitutes cutting tool shim 10 may be any of a ferrous alloy and a cobalt-chromium alloy. These materials are usable as materials for a metal 3D printer. A metal 3D printer can accurately produce coolant supply path 1 that has a complex shape.

(9) In cutting tool shim 10 according to any of the above (1) to (7), the material that constitutes cutting tool shim 10 may be a polycrystal.

(10) In cutting tool shim 10 according to the above (9), the polycrystal may have a particle diameter of not less than 4 μm and not more than 10 μm.

(11) In cutting tool shim 10 according to any of the above (1) to (10), the distance between the jetting port for arc-shaped portion and the arc-shaped portion may be not less than 3.0 mm and not more than 6.5 mm.

(12) In cutting tool shim 10 according to the above (11), the distance between the jetting port for arc-shaped portion and the arc-shaped portion may be not less than 3.8 mm and not more than 4.9 mm.

(13) A cutting tool 100 according to one aspect of the present invention comprises cutting tool shim 10 according to any of the above (1) to (12), cutting insert 20, and holder 30. This can reduce boundary wear.

DETAILS OF EMBODIMENTS OF THE INVENTION

The details of embodiments of the present invention are hereinafter described with reference to the drawings. In the drawings, identical or corresponding parts are identically denoted, and the description thereof is not repeated.

First Embodiment

First, the configuration of a cutting tool including a cutting tool shim in the first embodiment is described.

Figure 1:
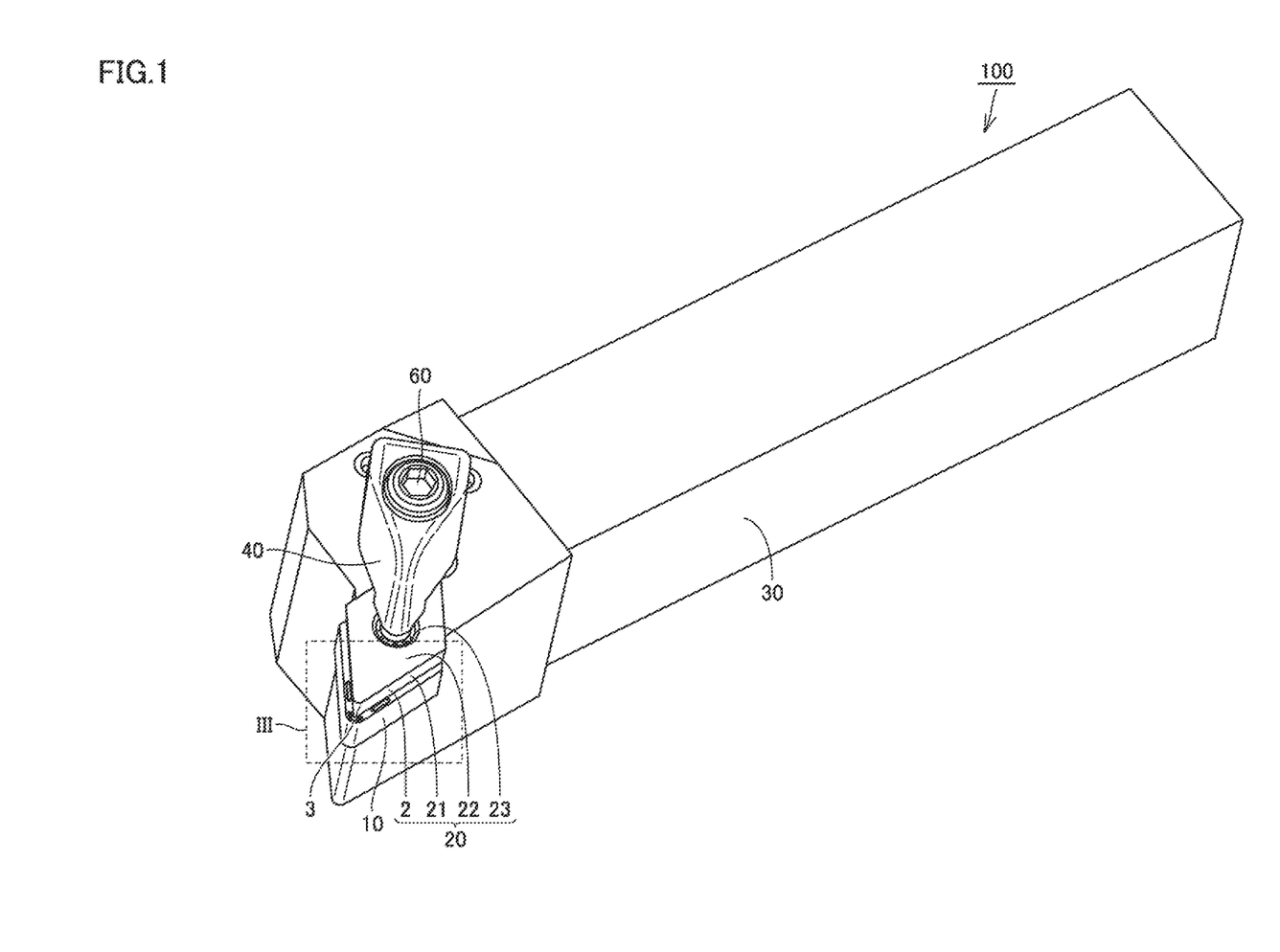
FIG. 1 is a perspective schematic view showing the configuration of a cutting tool including a cutting tool shim in the first embodiment.
Figure 2:
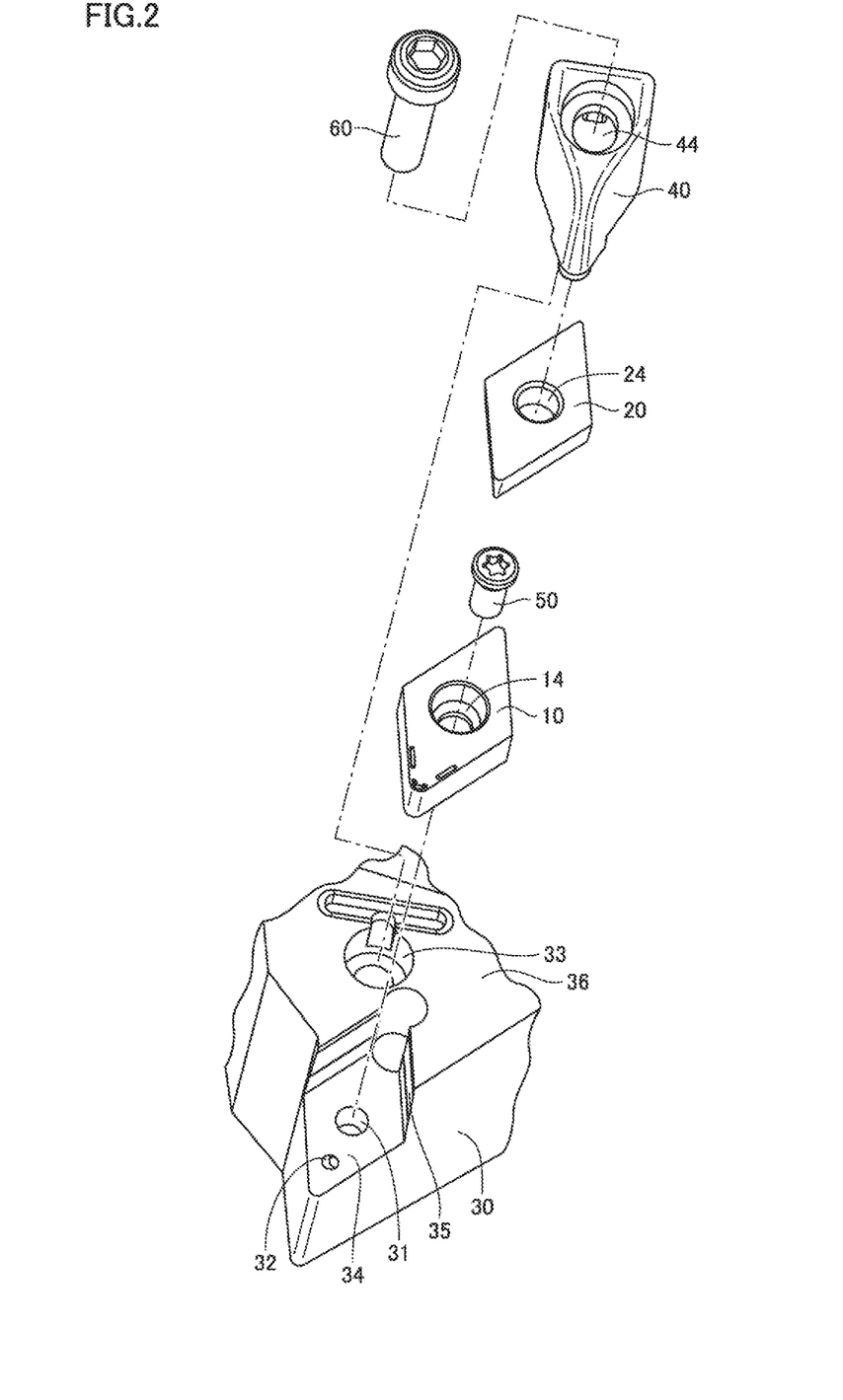
FIG. 2 is an exploded perspective schematic view showing the configuration of the cutting tool including the cutting tool shim in the first embodiment.

As shown in FIG. 1 and FIG. 2, a cutting tool 100 mainly includes a cutting tool shim 10 (hereinafter also referred to as a shim), a cutting insert 20, a holder 30, a fixation portion 40, a first fastening portion 50, and a second fastening portion 60. Holder 30 includes a seating surface 34, a side surface 35, and an upper surface 36. Seating surface 34 has a first fastening hole 31 and a coolant supply hole 32. Upper surface 36 has a second fastening hole 33. Side surface 35 extends in a direction that intersects both seating surface 34 and upper surface 36. Side surface 35 is continuous with both seating surface 34 and upper surface 36.

Shim 10 is disposed between cutting insert 20 and holder 30. Shim 10 has a first through-hole 14. First fastening portion 50 is inserted in first through-hole 14. First fastening portion 50 is screwed into first fastening hole 31, thus fixing shim 10 to holder 30. Fixation portion 40 is disposed on upper surface 36 of holder 30. The tip of fixation portion 40 is disposed in a second through-hole 24 provided in cutting insert 20. Fixation portion 40 partially covers the upper surface of cutting insert 20. Fixation portion 40 has a third through-hole 44. Second fastening portion 60 is disposed in third through-hole 44 and screwed into second fastening hole 33 provided in upper surface 36, thus fixing fixation portion 40 to holder 30. Fixation portion 40 fixes cutting insert 20.

Figure 3:
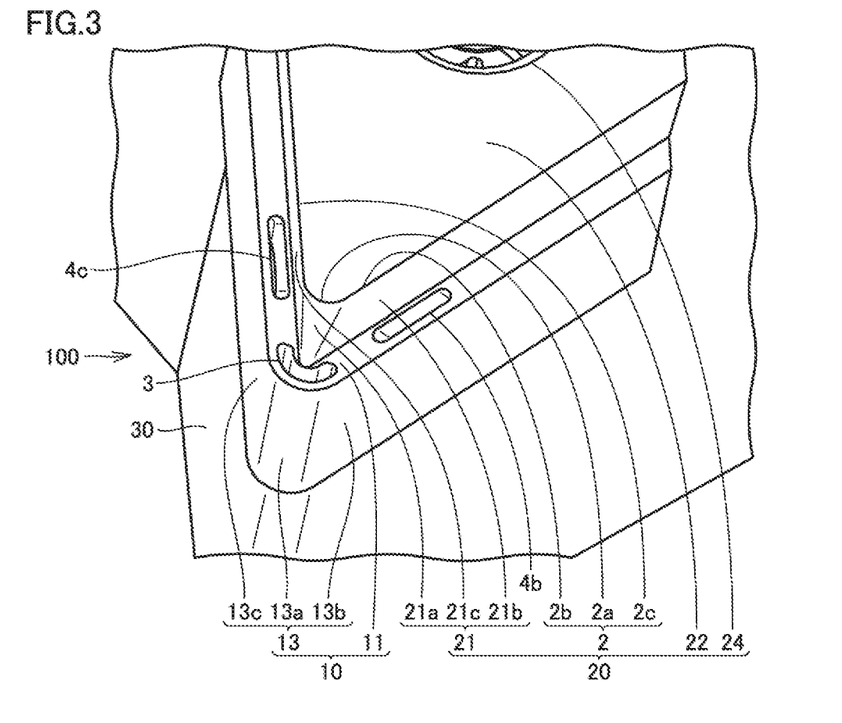
FIG. 3 is an enlarged perspective schematic view of region III in FIG. 1.

As shown in FIG. 3, cutting insert 20 includes a flank face 21, and a rake face 22 continuous with flank face 21. The ridgeline between flank face 21 and rake face 22 forms a cutting edge 2. Flank face 21 extends from cutting edge 2 toward shim 10. Rake face 22 is a face opposite to the face of cutting insert 20 in contact with shim 10. Cutting edge 2 includes an arc-shaped portion 2a, a first linear portion 2b, and a second linear portion 2c. First linear portion 2b and second linear portion 2c are each continuous with arc-shaped portion 2a. Arc-shaped portion 2a connects first linear portion 2b and second linear portion 2c. The arc-shaped portion mainly corresponds to the main cutting edge (the cutting edge that plays a major role for generating chips in cutting). In a portion around the boundaries between the arc-shaped portion and the linear portions, the tool advancing side mainly corresponds to the front cutting edge (generally, the cutting edge remote from the finished surface). In a portion around the boundaries between the arc-shaped portion and the linear portions, the side opposite to the tool advancing side mainly corresponds to the side cutting edge (generally, the cutting edge that forms the finished surface).

Flank face 21 has a first curved portion 21a, a first plane portion 21b, and a second plane portion 21c. First plane portion 21b and second plane portion 21c are each continuous with first curved portion 21a. First curved portion 21a connects first plane portion 21b and second plane portion 21c. Arc-shaped portion 2a is the ridgeline between first curved portion 21a and rake face 22. First linear portion 2b is the ridgeline between first plane portion 21b and rake face 22. Second linear portion 2c is the ridgeline between second plane portion 21c and rake face 22. The angle between the straight line along first linear portion 2b and the straight line along second linear portion 2c may be smaller than 90°. The angle between first plane portion 21b and rake face 22 may be smaller than 900 Similarly, the angle between second plane portion 21c and rake face 22 may be smaller than 90°.

Figure 4:
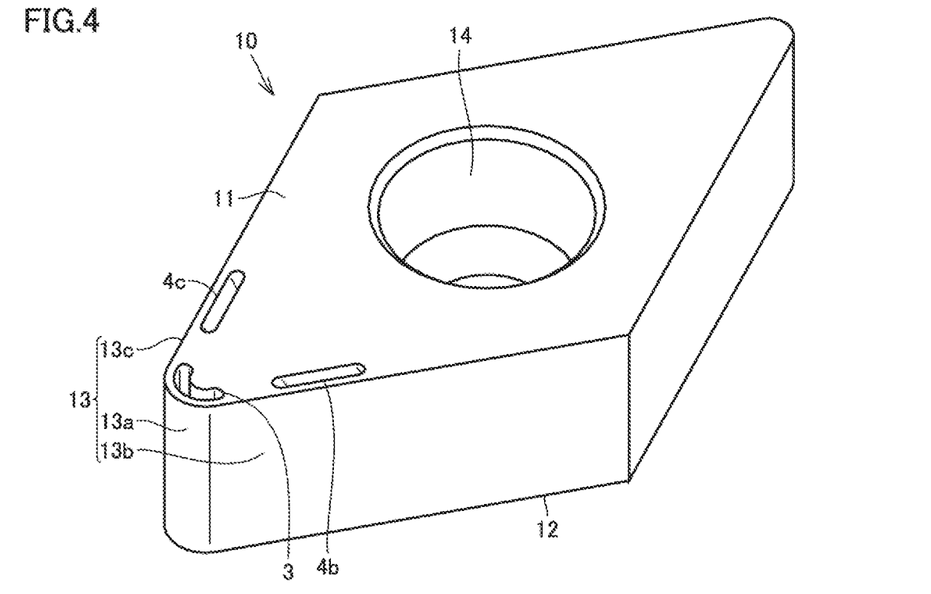
FIG. 4 is a perspective schematic view showing the configuration of the cutting tool shim in the first embodiment.
Figure 5:
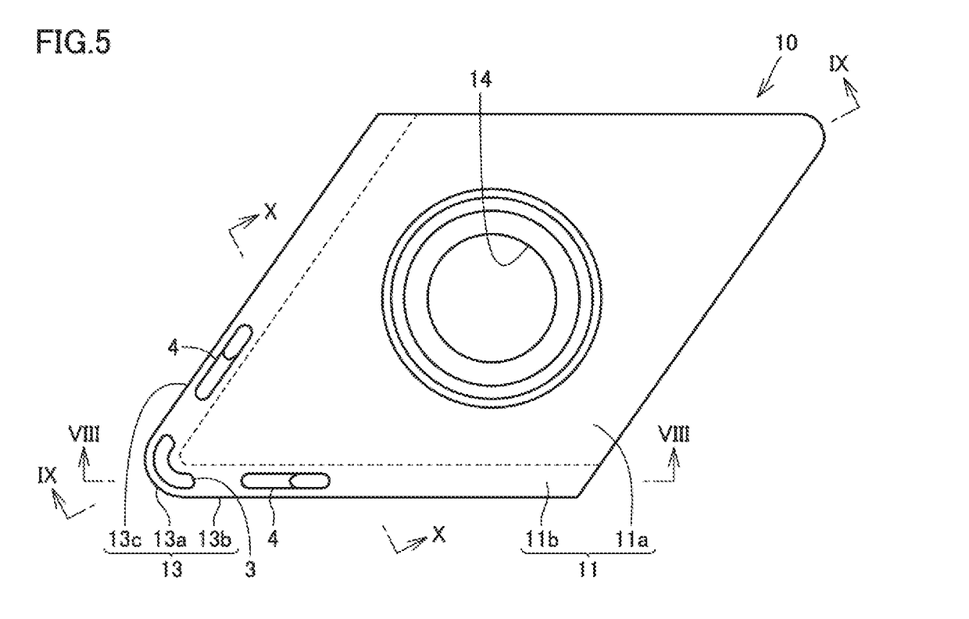
FIG. 5 is a plan schematic view showing the configuration of the cutting tool shim in the first embodiment.
Figure 6:
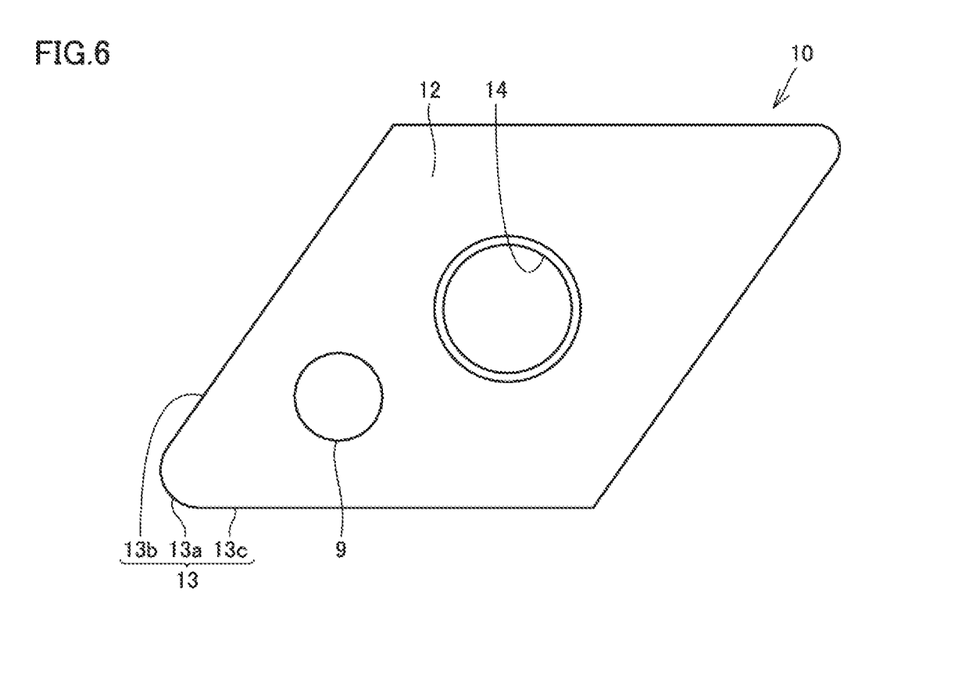
FIG. 6 is a bottom schematic view showing the configuration of the cutting tool shim in the first embodiment.

With reference to FIG. 4, FIG. 5, and FIG. 6, shim 10 has a top surface 11, a bottom surface 12, and a side surface 13. Bottom surface 12 is on the side opposite to top surface 11. Side surface 13 is continuous with both top surface 11 and bottom surface 12. Side surface 13 connects top surface 11 and bottom surface 12. Side surface 13 has a second curved portion 13a, a third plane portion 13b, and a fourth plane portion 13c. On top surface 11, cutting insert 20 is to be mounted. In other words, top surface 11 comes into contact with the bottom surface of cutting insert 20. As shown in FIG. 5, top surface 11 has a contact portion 11a to come into contact with cutting insert 20, and a protruding portion 11b continuous with contact portion 11a and separated from cutting insert 20. First through-hole 14 is open at both top surface 11 and bottom surface 12.

The material that constitutes shim 10 is, for example, a ferrous alloy and a cobalt-chromium alloy. The ferrous alloy is, for example, maraging steel, stainless steel (SUS316), or the like. The material that constitutes shim 10 is a formed body obtained by, for example, powder metallurgy, 3D printer, or cutting from a metal body. The material that constitutes shim 10 may be a single crystal or a polycrystal. The polycrystal is, for example, a metallic formed body obtained by powder metallurgy. The particle diameter of the polycrystal is, for example, not less than 4 µm and not more than 10 µm. The upper limit of the particle diameter may be 9 µm or may be 8 µm. The lower limit of the particle diameter may be 5 µm or may be 6 µm. The material that constitutes shim 10 is not limited to metal but may be any other material that can serve as a shim. In terms of workability and durability, the material that constitutes shim 10 is preferably a ferrous alloy and a cobalt-chromium alloy.

Next, a method of measuring the particle diameter is described. First, ion milling is performed using a cross section polisher (CP) to form a CP work surface of a shim. Then, the CP work surface is photographed using a scanning electron microscope (SEM), and the structure of the shim is observed. The analytical method is electron back-scatter diffraction (EBSD) analysis. The accelerating voltage is 15 kV. A photograph is taken with a magnification of 500 times. Based on the difference in crystal orientation of each crystal in the polycrystal, the grain boundary is observed and the particle diameter is measured.

For example, a metal 3D printer can be used to produce shim 10. Specifically, shim 10 is produced by heating metallic powder by laser. Thus, pores can be formed in shim 10. The density of shim 10 is less than 100%. Specifically, the density of shim 10 is, for example, not less than 99.00% and not more than 99.99%/o. The upper limit of the density may be 99.95% or may be 99.90%. The lower limit of the density may be 99.10% or may be 99.20%. The density of shim 10 being less than 100% (that is, pores being present in the shim) enhances the vibration damping properties.

Next, a method of measuring the shim density is described. First, ion milling is performed using a cross section polisher to form a CP work surface of a shim. Then, the CP work surface is photographed using a scanning electron microscope (SEM) to provide a two-dimensional structure photograph of the shim with a magnification of 100 times. Pores in the structure are identified using image processing software (WinROOF Ver. 7.4.1) manufactured by Mitani Corporation. Specifically, the region with pores and the region without pores are determined by performing conversion to binary on the structure photograph. The shim density is determined as ([the total area of the measurement field]−[the area of pores])/(the total area of the measurement field). If no pores are present in the shim, the shim density is 100%.

The Rockwell hardness of the material that constitutes shim 10 may be, for example, not less than 20 and not more than 60. The upper limit of the Rockwell hardness may be 58 or may be 56. The lower limit of the Rockwell hardness may be 22 or may be 24. The Rockwell hardness is determined by, for example, measuring Rockwell hardness C scale (HRC) in accordance with the method provided in Japan Industrial Standard (JIS Z 2245). Specifically, a sample is indented with a conical diamond indenter, and the permanent indentation depth h (mm) is measured. The test force is 10 kgf. The additional test force is 140 kgf. The total test force is 150 kgf. The HRC is calculated in accordance with the following numerical formula 1. Note that the international standard equivalent to Japan Industrial Standard (JIS Z 2245) is ISO 6508-1.

$$HRC=100-h/0.002 \qquad \text{(numerical formula 1)}$$

Figure 7:
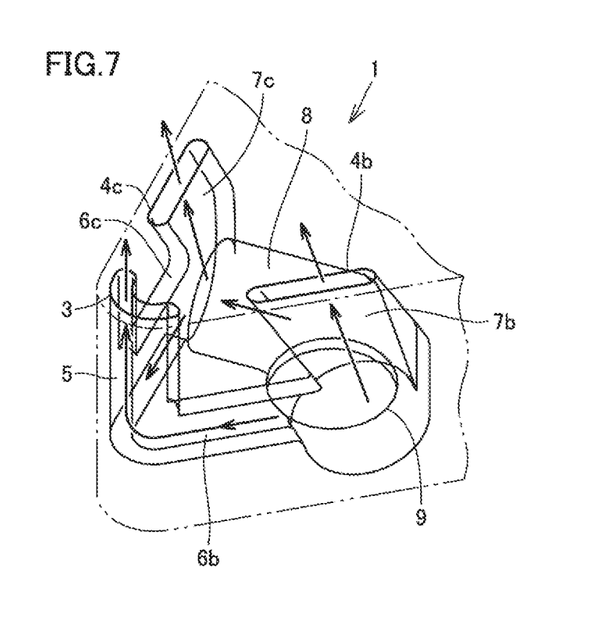
FIG. 7 is a perspective schematic view showing the configuration of the coolant supply path of the cutting tool shim in the first embodiment.

As shown in FIG. 7, a coolant supply path 1 is provided in shim 10. Coolant supply path 1 is for jetting coolant, which is supplied from holder 30, to cutting edge 2. Coolant supply path 1 includes a lead-in port 9, a jetting port 3 for arc-shaped portion, a jetting port 4b for first linear portion, and a jetting port 4c for second linear portion. Lead-in port 9 is for leading coolant from holder 30 into coolant supply path 1. Lead-in port 9 communicates with coolant supply hole 32 provided in seating surface 34 of holder 30. Jetting port 3 for arc-shaped portion is for jetting coolant to arc-shaped portion 2a. The distance between jetting port 3 for arc-shaped portion and arc-shaped portion 2a is, for example, about not less than 2.2 mm and not more than 8.1 mm. The distance between jetting port 3 for arc-shaped portion and arc-shaped portion 2a is the distance between jetting port 3 for arc-shaped portion and arc-shaped portion 2a in the direction perpendicular to top surface 11. The distance between jetting port 3 for arc-shaped portion and arc-shaped portion 2a may be not less than 3.0 mm and not more than 6.5 mm, or may be not less than 3.8 mm and not more than 4.9 mm. Jetting port 4b for first linear portion is for jetting coolant to first linear portion 2b. Similarly, jetting port 4c for second linear portion is for jetting coolant to second linear portion 2c.

As shown in FIG. 5, jetting port 3 for arc-shaped portion, jetting port 4b for first linear portion, and jetting port 4c for second linear portion are open at protruding portion 11b of top surface 11. First through-hole 14 is open at contact portion 11a. As shown in FIG. 6, lead-in port 9 is open at, for example, bottom surface 12. However, lead-in port 9 may be open at a surface other than bottom surface 12. Lead-in port 9 may be open at, for example, side surface 13.

Figure 8:
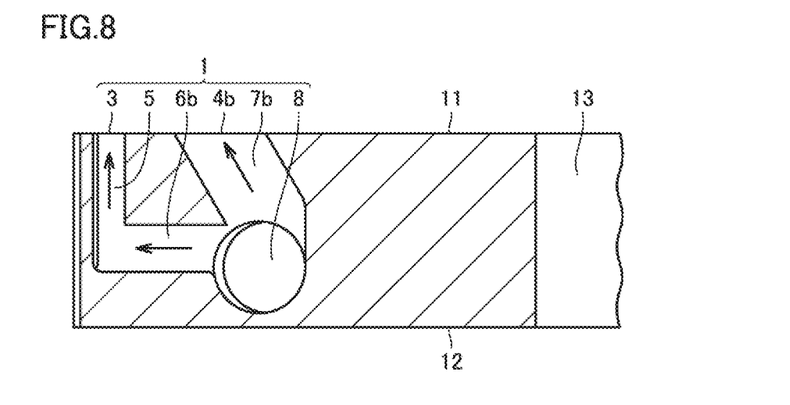
FIG. 8 is a cross-sectional schematic view taken along the line VIII-VIII in FIG. 5.
Figure 9:
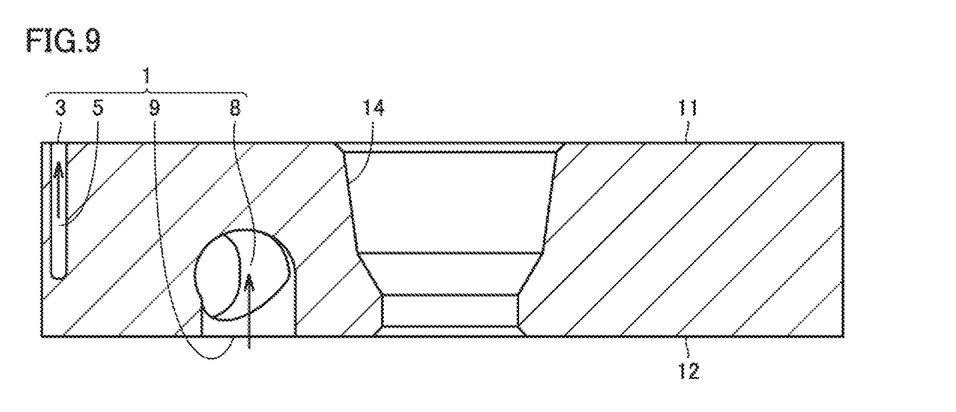
FIG. 9 is a cross-sectional schematic view taken along the line IX-IX in FIG. 5.
Figure 10:
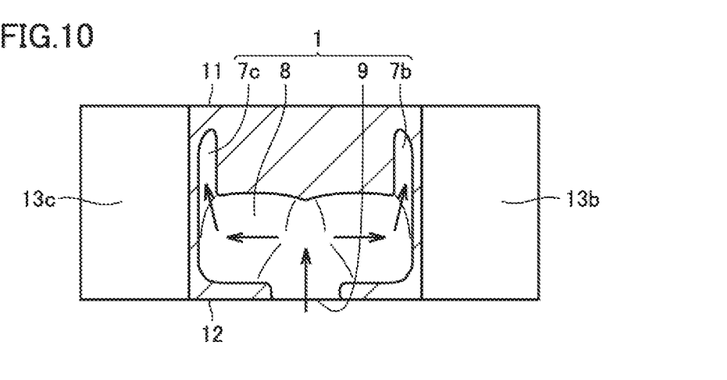
FIG. 10 is a cross-sectional schematic view taken along the line X-X in FIG. 5.

As shown in FIG. 7, FIG. 8, FIG. 9, and FIG. 10, coolant supply path 1 further includes a vertical pathway 5, a first lateral pathway 6b, a second lateral pathway 6c, a first oblique pathway 7b, a second oblique pathway 7c, and a central pathway 8. As shown in FIG. 8, vertical pathway 5 is continuous with jetting port 3 for arc-shaped portion. As shown in FIG. 7, vertical pathway 5 is continuous with first lateral pathway 6b and second lateral pathway 6c. As shown in FIG. 8, first oblique pathway 7b is continuous with jetting port 4b for first linear portion and central pathway 8. Similarly, second oblique pathway 7c is continuous with jetting port 4c for second linear portion and central pathway 8. As shown in FIG. 8 and FIG. 9, vertical pathway 5 extends in the direction perpendicular to top surface 11. Each of first lateral pathway 6b and second lateral pathway 6c extends in the direction parallel to top surface 11. As shown in FIG. 7 and FIG. 8, each of first oblique pathway 7b and second oblique pathway 7c extends obliquely with respect to top surface 11. As shown in FIG. 10, central pathway 8 is continuous with both first oblique pathway 7b and second oblique pathway 7c.

The arrows in FIG. 7 to FIG. 10 represent the flow of coolant. Coolant supplied from holder 30 passes through lead-in port 9 to be led into central pathway 8. Part of the coolant branches from central pathway 8 into first lateral pathway 6b and second lateral pathway 6c, and they join together at vertical pathway 5. Part of the coolant passes through vertical pathway 5 and jets from jetting port 3 for arc-shaped portion to arc-shaped portion 2a in the shape of curtain (in the shape of layer). The other part of the coolant branches from central pathway 8 into first oblique pathway 7b and second oblique pathway 7c. The coolant that has passed through first oblique pathway 7b jets from jetting port 4b for first linear portion to first linear portion 2b in the shape of curtain (in the shape of layer) Similarly, the coolant that has passed through second oblique pathway 7c jets from jetting port 4c for second linear portion to second linear portion 2c in the shape of curtain (in the shape of layer).

Next, the shape of the jetting port for arc-shaped portion is described in detail.

Figure 11:
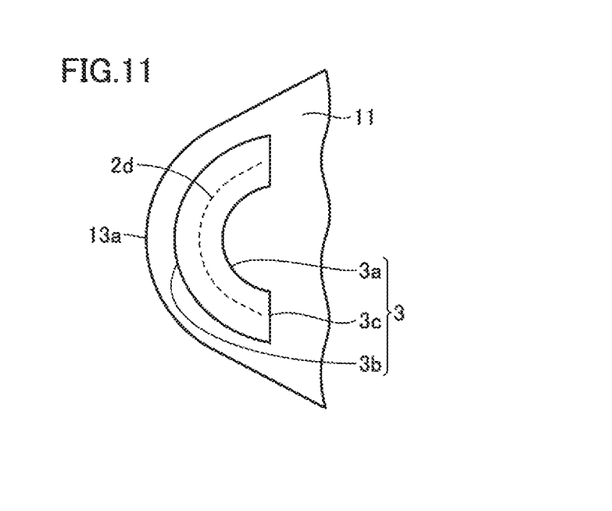
FIG. 11 is a plan schematic view showing the configuration of a jetting port for an arc-shaped portion provided in the cutting tool shim in the first embodiment.

As shown in FIG. 11, jetting port 3 for arc-shaped portion has a curved shape along arc-shaped portion 2a. Broken line 2d shows the same shape as arc-shaped portion 2a of cutting edge 2 of cutting insert 20. The curved shape along arc-shaped portion 2a includes an opening curved along broken line 2a. Specifically, as shown in FIG. 11, as seen in the direction perpendicular to top surface 11, the region surrounded by jetting port 3 for arc-shaped portion coincides with broken line 2d. Jetting port 3 for arc-shaped portion may surround broken line 2d. Arc-shaped portion 2a may have a curved shape formed by arcs having different curvatures continuous with each other.

Jetting port 3 for arc-shaped portion may be a single hole having an outer circumference arc 3a, an inner circumference arc 3b, and a connection portion 3c. Outer circumference arc 3a is provided along arc-shaped portion 2a. Inner circumference arc 3b is separated from outer circumference arc 3a and provided along arc-shaped portion 2a. Connection portion 3c connects outer circumference arc 3a and inner circumference arc 3b. Inner circumference arc 3b may be smaller than outer circumference arc 3a in radius of curvature. Outer circumference arc 3a is located between inner circumference arc 3b and second curved portion 13a. Jetting port 3 for arc-shaped portion is preferably smaller than lead-in port 9 in area. This allows coolant to jet from jetting port 3 for arc-shaped portion at a high pressure.

Next, the shapes of the jetting port for first linear portion and the jetting port for second linear portion are described in detail.

Jetting port 4b for first linear portion extends, for example, along a straight line parallel to first linear portion 2b. Jetting port 4b for first linear portion may be a single hole, or may be a plurality of slits disposed at intervals along a straight line. Similarly, jetting port 4c for second linear portion extends, for example, along a straight line parallel to second linear portion 2c. Jetting port 4c for second linear portion may be a single hole, or may be a plurality of slits disposed at intervals along a straight line.

Next, the advantageous effects of the cutting tool shim and the cutting tool in the first embodiment are described.

Cutting tool shim 10 for the cutting tool in the first embodiment includes jetting port 3 for arc-shaped portion for jetting coolant to arc-shaped portion 2a of cutting edge 2. Jetting port 3 for arc-shaped portion has a curved shape along arc-shaped portion 2a. This allows coolant to jet to arc-shaped portion 2a in the shape of layer (in the shape of curtain). Thus, coolant can be supplied over a wide region of arc-shaped portion 2a. As a result, occurrence of local wear of the cutting edge can be reduced. In particular, coolant is supplied to a portion around the boundary between arc-shaped portion 2a and linear portion 2b continuous with arc-shaped portion 2a. Accordingly, boundary wear around the boundary in the flank face can be reduced. Further, since the jetting port is provided in the shim, the jetting port can be brought closer to the edge of the cutting tool than when a jetting port is provided in the holder. This can shorten the distance between jetting port 3 for arc-shaped portion and arc-shaped portion 2a of cutting edge 2. As a result, coolant can accurately jet to arc-shaped portion 2a. Further, the mechanism which jets coolant from the shim, not from the holder body, allows easy replacement.

Further, in shim 10 in the first embodiment, jetting port 3 for arc-shaped portion includes outer circumference arc 3a provided along arc-shaped portion 2a, and inner circumference arc 3b separated from outer circumference arc 3a and provided along arc-shaped portion 2a. Thus, coolant can be supplied over a wide region of arc-shaped portion 2a.

Further, shim 10 in the first embodiment includes top surface 11 on which cutting insert 20 is to be mounted. Top surface 11 has contact portion 11a to come into contact with cutting insert 20, and protruding portion 11b continuous with contact portion 11a and separated from cutting insert 20. Jetting port 3 for arc-shaped portion is open at protruding portion 11b. Thus, coolant can be effectively supplied to arc-shaped portion 2a.

Further, according to shim 10 in the first embodiment, cutting edge 2 further includes linear portion 2b continuous with arc-shaped portion 2a. Coolant supply path 1 further includes jetting port 4b for linear portion for jetting coolant to linear portion 2b Thus, coolant can be supplied to linear portion 2b, and also to a portion around the boundary between arc-shaped portion 2a and linear portion 2b. This can reduce wear in linear portion 2b and can also reduce boundary wear.

Further, according to shim 10 in the first embodiment, the density of shim 10 is not less than 99.0% and not more than 99.9%. Pores provided in shim 10 can reduce vibrations during cutting.

Further, according to shim 10 in the first embodiment, the material that constitutes shim 10 is any one of a ferrous alloy and a cobalt-chromium alloy. These materials are usable as materials for a metal 3D printer. A metal 3D printer can accurately produce coolant supply path 1 that has a complex shape.

Second Embodiment

Next, the configurations of a cutting tool and a shim therefor in the second embodiment are described. The following mainly describes the differences from the cutting tool and the shim therefor in the first embodiment, and redundant description is not repeated.

Figure 12:
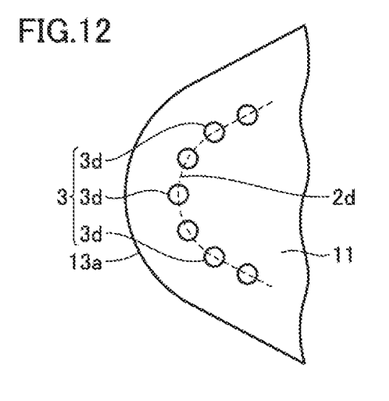
FIG. 12 is a plan schematic view showing the configuration of a jetting port for an arc-shaped portion provided in a cutting tool shim in the second embodiment.
Figure 13:
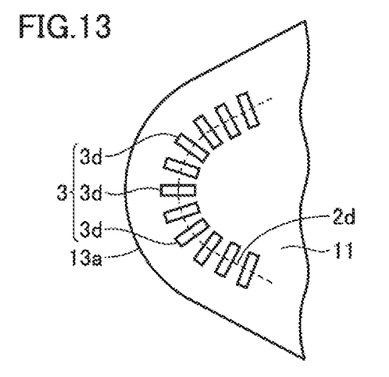
FIG. 13 is a plan schematic view showing the configuration of a variation of the jetting port for the arc-shaped portion provided in the cutting tool shim in the second embodiment.

Jetting port 3 for arc-shaped portion has a curved shape along arc-shaped portion 2a. As shown in FIG. 12, the curved shape along arc-shaped portion 2a includes an opening formed by a plurality of slits 3d provided along broken line 2d, which is in the same shape as that of arc-shaped portion 2a. In this configuration, jetting port 3 for arc-shaped portion is formed by a plurality of slits 3d. The plurality of slits 3d are separated from one another. Each of the plurality of slits 3d is, for example, circular in shape. As shown in FIG. 13, each of the plurality of slits 3d may be rectangular in shape. Each slit 3d may have any other shape, such as an ellipse, a regular square, or a polygon. The total area of slits 3d which form jetting port 3 for arc-shaped portion is preferably smaller than the area of lead-in port 9. If lead-in port 9 includes a plurality of lead-in slits corresponding the plurality of jetting slits, each of the plurality of jetting slits is preferably smaller in area than a corresponding one of the plurality of lead-in slits. This allows coolant to jet from each slit 3d at a high pressure. The cutting tool in the second embodiment provides the same advantageous effects as those of the cutting tool in the first embodiment.

Third Embodiment

Next, the configurations of a cutting tool and a shim therefor in the third embodiment are described. The following mainly describes the differences from the cutting tool and the shim therefor in the first embodiment, and redundant description is not repeated.

Figure 14:
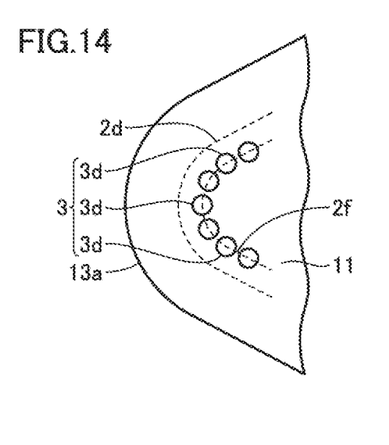
FIG. 14 is a plan schematic view showing the configuration of a jetting port for an arc-shaped portion provided in a cutting tool shim in the third embodiment.
Figure 15:
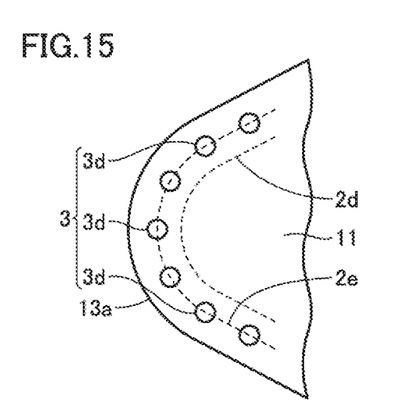
FIG. 15 is a plan schematic view showing the configuration of a variation of the jetting port for the arc-shaped portion provided in the cutting tool shim in the third embodiment.

As shown in FIG. 14 and FIG. 15, jetting port 3 for arc-shaped portion may be formed by a plurality of slits 3d provided along a shape similar to the shape of arc-shaped portion 2a. A shape similar to the shape of arc-shaped portion 2a refers to the same, geometrically similar shape to the shape of arc-shaped portion 2a. In FIG. 14, broken line 2f shows the same shape as, but scaled down from arc-shaped portion 2a. The center of the circle along broken line 2f coincides with the center of the circle along broken line 2d. As shown in FIG. 14, a plurality of slits 3d may be provided along broken line 2f. In FIG. 15, broken line 2e shows the same shape as, but scaled up from arc-shaped portion 2a. The center of the circle along broken line 2e coincides with the center of the circle along broken line 2d. As shown in FIG. 15, a plurality of slits 3d may be provided along broken line 2e. Alternatively, a single, curved jetting port 3 for arc-shaped portion may be provided along broken line 2f or broken line 2e. The cutting tool in the third embodiment provides the same advantageous effects as those of the cutting tool in the first embodiment.

Fourth Embodiment

Next, the configurations of a cutting tool and a shim therefor in the fourth embodiment are described. The following mainly describes the differences from the cutting tool and the shim therefor in the first embodiment, and redundant description is not repeated.

Figure 16:
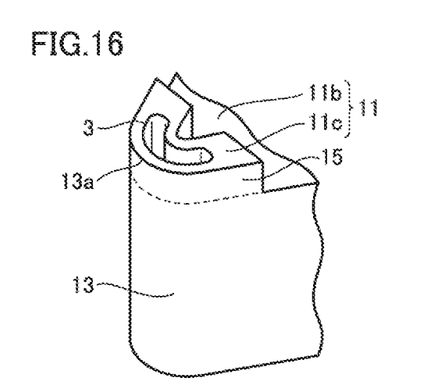
FIG. 16 is a perspective schematic view showing the configuration of a jetting port for an arc-shaped portion provided in a cutting tool shim in the fourth embodiment.

As shown in FIG. 16, shim 10 may include a stand portion 15. Stand portion 15 forms a part of second curved portion 13a and protrudes in the direction perpendicular to top surface 11. The upper surface 11c of stand portion 15 is a part of top surface 11. Upper surface 11c is closer to rake face 22 of cutting insert 20 than protruding portion 11b is Jetting port 3 for arc-shaped portion may be provided in upper surface 11c of stand portion 15. This allows jetting port 3 for arc-shaped portion to be brought closer to arc-shaped portion 2a of cutting insert 20. The cutting tool in the fourth embodiment provides the same advantageous effects as those of the cutting tool in the first embodiment.

Example 1

(Preparation of Samples)

First, shims of samples 1-1 to 1-9 were prepared. The shims of samples 1-1 to 1-6 are the present examples. The shims of samples 1-7 to 1-9 are comparative examples. The material of the shims of samples 1-1, 1-2 and 1-8 was maraging steel. The material of the shims of samples 1-3 and 1-4 was SUS316. The material of the shims of samples 1-5 and 1-6 was Co—Cr alloy. The material of the shim of sample 1-7 was cemented carbide. The material of the shim of sample 1-9 was SUS304. The shim density of samples 1-1 to 1-6 was not less than 99.25% and less than 99.99. The shim density of samples 1-7 to 1-9 was not less than 99.99% and not more than 100%.

(Evaluation Method)

A cutting holder having an acceleration sensor attached to its bottom surface was fixed to a turret of a machine tool. A shim and a cutting insert were attached to the cutting holder. The edge of the cutting insert was vibrated with a force of 200 N using an impulse hammer. The change of the vibration acceleration (mm/s$^2$) with respect to time was measured by the acceleration sensor. The time ($t_1$-$t_0$) from the point of time ($t_0$), at which the vibration acceleration had the maximum amplitude, to the point of time ($t_1$), at which the amplitude of the vibration acceleration became equal to or less than 0.01 times the maximum amplitude for the first time, was calculated as the vibration damping time.

(Evaluation Results)

TABLE 1

|  | Material of Shim | Density (%) | Vibration Damping Time (μs) |
|---|---|---|---|
| Sample 1-1 | maraging steel | 99.25 | 5.1 |
| Sample 1-2 | maraging steel | 99.91 | 5.4 |
| Sample 1-3 | SUS316 | 99.30 | 5.3 |
| Sample 1-4 | SUS316 | 99.97 | 5.8 |
| Sample 1-5 | Co—Cr alloy | 99.33 | 5.2 |
| Sample 1-6 | Co—Cr alloy | 99.61 | 5.6 |

TABLE 1-continued

|  | Material of Shim | Density (%) | Vibration Damping Time (μs) |
|---|---|---|---|
| Sample 1-7 | cemented carbide | 99.99 | 9.5 |
| Sample 1-8 | maraging steel | 100 | 8.2 |
| Sample 1-9 | SUS304 | 100 | 8.8 |

As shown in Table 1, the vibration damping time in the case of the shims of samples 1-1 to 1-6 was not less than 5.1 μs and not more than 5.8 μs, whereas the vibration damping time in the case of the shims of samples 1-7 to 1-9 was not less than 8.2 μs and not more than 9.5 μs. In the case of the shims of samples 1-1 to 1-6, the vibration damping time was shorter than in the case of the shims of samples 1-7 to 1-9. Thus, it is shown that a shim density of less than 99.99% remarkably enhances the vibration damping properties regardless of the material of the shim. It is also shown that, with the same material, a lower shim density makes the vibration damping time shorter.

Example 2

(Preparation of Samples)

First, cutting tools of samples 2-1 to 2-5 were prepared. The cutting tools of samples 2-1 to 2-3 are the present examples. The cutting tools of samples 2-4 and 2-5 are comparative examples. For the cutting tools of samples 2-1 to 2-3, cutting oil was jetted from a shim through a holder. For the cutting tool of sample 2-4, cutting oil was jetted from the bottom surface of a holder through the holder. For the cutting tool of sample 2-5, cutting oil was jetted from outside.

For the cutting tools of samples 2-1 and 2-2, the jetting port was in the shape of an arc. For the cutting tool of sample 2-3, the jetting port was in the shape of a plurality of circular holes arranged in an arc. For the cutting tools of samples 2-4 and 2-5, the jetting port was in the shape of a single circular hole. For the cutting tool of sample 2-1, the oiling pressure was 1.5 MPa. For the cutting tools of samples 2-2 to 2-4, the oiling pressure was 7 MPa. For the cutting tool of sample 2-5, the oiling pressure was 0.15 MPa.

(Evaluation Method 1)

A work material made of inconel 718 was cut 1 km using the cutting tools of samples 2-1 to 2-5. Then, the flank face wear volume and the boundary wear volume of cutting insert were measured. The cutting speed (Vc) was 200 m/min. The feed rate (f) was 0.2 mm/rotation. The depth of cut (ap) was 0.2 mm. Each cutting insert was a CBN sintered body, BN7000 manufactured by Sumitomo Electric Hardmetal Corporation. The CBN content in the CBN sintered body was 90% by volume, with a WC-Co binder being added.

(Evaluation Results 1)

TABLE 2

|  | Oiling System for Cutting Oil | Jetting Port Shape | Oiling Pressure | Flank Face Wear Volume After Cutting 1 km (mm) | Boundary Wear Volume After Cutting 1 km (mm) |
|---|---|---|---|---|---|
| Sample 2-1 | jet from shim through holder | arc shape | 1.5 MPa | 0.056 | 0.068 |
| Sample 2-2 | jet from shim through holder | arc shape | 7 MPa | 0.041 | 0.051 |
| Sample 2-3 | jet from shim through holder | arrange a plurality of circular holes in arc shape | 7 MPa | 0.043 | 0.055 |
| Sample 2-4 | jet from holder bottom surface through holder | circular hole | 7 MPa | 0.115 | 0.133 |
| Sample 2-5 | oil from outside | circular hole | 0.15 MPa | 0.188 | 0.243 |

As shown in Table 2, in the case of the cutting tools of samples 2-1 to 2-3, the flank face wear volume and the boundary wear volume of cutting insert were respectively not less than 0.041 mm and not more than 0.056 mm, and not less than 0.051 mm and not more than 0.068 mm; whereas in the case of the cutting tools of samples 2-4 and 2-5, the flank face wear volume and the boundary wear volume of cutting insert were respectively not less than 0.115 mm and not more than 0.188 mm, and not less than 0.133 mm and not more than 0.243 mm. This result shows that cutting fluid jetted from a shim can remarkably reduce the flank face wear volume and the boundary wear volume of cutting insert.

In the case of the cutting tool of sample 2-2, the flank face wear volume and the boundary wear volume of cutting insert were smaller than in the case of the cutting tool of sample 2-1. This result shows that a higher oiling pressure can reduce the flank face wear volume and the boundary wear volume of cutting insert. Further, the flank face wear volume and the boundary wear volume of cutting insert in the case of the cutting tool of sample 2-2 were substantially the same as the flank face wear volume and the boundary wear volume of cutting insert in the case of the cutting tool of sample 2-3. This result shows that a jetting port formed by a plurality of circular holes arranged in an arc shape has the same advantageous effects as those of an arc-shaped jetting port.

(Evaluation Method 2)

A work material made of titanium alloy (Ti-6Al-4V) was cut 1 km using the cutting tools of samples 2-1 to 2-5. Then, the flank face wear volume and the boundary wear volume of cutting insert were measured. The cutting speed (Vc) was 100 m/min. The feed rate (f) was 0.1 mm/rotation. The depth of cut (ap) was 0.2 mm. Each cutting insert was a CBN sintered body, BN7000 manufactured by Sumitomo Electric Hardmetal Corporation. The CBN content in the CBN sintered body was 90% by volume, with a WC-Co binder being added.

(Evaluation Results 2)

TABLE 3

| | Oiling System for Cutting Oil | Jetting Port Shape | Oiling Pressure | Flank Face Wear Volume After Cutting 1 km (mm) | Boundary Wear Volume After Cutting 1 km (mm) |
|---|---|---|---|---|---|
| Sample 2-1 | jet from shim through holder | arc shape | 1.5 MPa | 0.044 | none |
| Sample 2-2 | jet from shim through holder | arc shape | 7 MPa | 0.039 | none |
| Sample 2-3 | jet from shim through holder | arrange a plurality of circular holes in arc shape | 7 MPa | 0.038 | none |
| Sample 2-4 | jet from holder bottom surface through holder | one circular hole | 7 MPa | 0.061 | 0.089 |
| Sample 2-5 | oil from outside | one circular hole | 0.15 MPa | 0.119 | 0.158 |

As shown in Table 3, in the case of the cutting tools of samples 2-1 to 2-3, the flank face wear volume of cutting insert was not less than 0.038 mm and not more than 0.044 mm; whereas in the case of the cutting tools of samples 2-4 and 2-5, the flank face wear volume of cutting insert was not less than 0.061 mm and not more than 0.119 mm. Further, in the case of the cutting tools of samples 2-1 to 2-3, the boundary wear did not occur in the cutting insert; whereas in the case of the cutting tools of samples 2-4 and 2-5, the boundary wear of not less than 0.089 mm and not more than 0.158 mm occurred in the cutting insert. These results show that cutting fluid jetted from a shim can remarkably reduce the flank face wear volume of cutting insert and reduce occurrence of the boundary wear.

Further, in the case of the cutting tool of sample 2-2, the flank face wear volume of cutting insert was smaller than in the case of the cutting tool of sample 2-1. This result shows that a higher oiling pressure can reduce the flank face wear volume of cutting insert. Further, the flank face wear volume of cutting insert in the case of the cutting tool of sample 2-2 was substantially the same as the flank face wear volume of cutting insert in the case of the cutting tool of sample 2-3. This result shows that a jetting port formed by a plurality of circular holes arranged in an arc shape has the same advantageous effects as those of an arc-shaped jetting port.

Example 3

(Preparation of Samples)

First, cutting tools of samples 3-1 to 3-8 were prepared. The cutting tools of samples 3-1 to 3-5 are the present examples. The cutting tools of samples 3-6 to 3-8 are comparative examples. For the cutting tools of samples 3-1 to 3-6, cutting oil was jetted from a shim through a holder. For the cutting tools of samples 3-7 and 3-8, cutting oil was jetted from the bottom surface of a holder through the holder. The distances between the jetting ports and the edges for the cutting tools of samples 3-1 to 3-8 were respectively 2.2 mm, 3.0 mm, 3.8 mm, 4.9 mm, 8.1 mm, 1.0 mm, 10 mm, and 20 mm. For the cutting tools for all the samples, the oiling pressure was 7 MPa.

(Evaluation Method)

A work material made of inconel 718 was cut 1 km using the cutting tools of samples 3-1 to 3-8. Then, the flank face wear volume and the boundary wear volume of cutting insert were measured. The cutting speed (Vc) was 200 m/min. The feed rate (f) was 0.2 mm/rotation. The depth of cut (ap) was 0.2 mm. Each cutting insert was a CBN sintered body, BN7000 manufactured by Sumitomo Electric Hardmetal Corporation.

(Evaluation Results)

TABLE 4

| | Distance Between Jetting Port and Edge (mm) | Oiling System for Cutting Oil | Oiling Pressure | Flank Face Wear Volume After Cutting 1 km (mm) | Boundary Wear Volume After Cutting 1 km (mm) |
|---|---|---|---|---|---|
| Sample 3-1 | 2.2 | jet from shim through holder | 7 MPa | 0.053 | 0.061 |
| Sample 3-2 | 3.0 | jet from shim through holder | 7 MPa | 0.044 | 0.057 |
| Sample 3-3 | 3.8 | jet from shim through holder | 7 MPa | 0.041 | 0.048 |
| Sample 3-4 | 4.9 | jet from shim through holder | 7 MPa | 0.043 | 0.050 |
| Sample 3-5 | 8.1 | jet from shim through holder | 7 MPa | 0.050 | 0.062 |
| Sample 3-6 | 1.0 | jet from shim through holder | 7 MPa | 0.047 | 0.091 |
| Sample 3-7 | 10 | jet from holder bottom surface through holder | 7 MPa | 0.078 | 0.086 |
| Sample 3-8 | 20 | jet from holder bottom surface through holder | 7 MPa | 0.106 | 0.089 |

As shown in Table 4, in the case of the cutting tools of samples 3-1 to 3-5, the boundary wear volume of cutting insert was not less than 0.048 mm and not more than 0.062 mm; whereas in the case of the cutting tools of samples 3-6 to 3-8, the boundary wear volume of cutting insert was not less than 0.086 mm and not more than 0.091 mm. This result shows that the boundary wear volume of cutting insert can be remarkably reduced by setting the distance between the jetting port and the edge to not less than 2.2 mm and not more than 8.1 mm. It is also shown that the boundary wear volume of cutting insert can further be reduced by setting the distance between the jetting port and the edge to not less than 3.0 mm and not more than 4.9 mm.

In the case of the cutting tools of samples 3-1 to 3-6, the flank face wear volume of cutting insert was not less than 0.041 mm and not more than 0.053 mm; whereas in the case of the cutting tools of samples 3-7 and 3-8, the boundary wear volume of cutting insert was not less than 0.078 mm and not more than 0.106 mm. This result shows that cutting oil jetted from a shim can reduce the flank face wear volume of cutting insert more effectively than cutting oil jetted from the bottom surface of a holder.

It should be construed that the embodiments and the examples disclosed herein are given by way of example in every respect, not by way of limitation. It is intended that the scope of the present invention is defined by the claims, not by the above-described embodiments, and includes any modification equivalent in meaning and scope to the claims.

REFERENCE SIGNS LIST

1: coolant supply path; 2: cutting edge; 2a: arc-shaped portion; 2b: first linear portion (linear portion); 2c: second linear portion; 2d, 2e, 2f: broken line; 3: jetting port for arc-shaped portion; 3D: metal; 3a: outer circumference arc; 3b: inner circumference arc; 3c: connection portion; 3d: slit; 4b: jetting port for first linear portion (jetting port for linear portion); 4c: jetting port for second linear portion; 5: vertical pathway; 6b: first lateral pathway; 6c: second lateral pathway; 7b: first oblique pathway; 7c: second oblique pathway; 8: central pathway; 9: lead-in port; 10: cutting tool shim (shim); 11: top surface; 11a: contact portion; 11b: protruding portion; 11c, 36: upper surface; 12: bottom surface; 13, 35: side surface; 13a: second curved portion; 13b: third plane portion; 13c: fourth plane portion; 14: first through-hole; 15: stand portion; 20: cutting insert; 21: flank face; 21a: first curved portion; 21b: first plane portion; 21c: second plane portion; 22: rake face; 24: second through-hole; 30: holder; 31: first fastening hole; 32: coolant supply hole; 33: second fastening hole; 34: seating surface; 40: fixation portion; 44: third through-hole; 50: first fastening portion; 60: second fastening portion; 100: cutting tool

The invention claimed is:

1. A cutting tool shim to be disposed between a cutting insert and a holder and to be fixed to the holder,
the cutting tool shim including a top surface on which the cutting insert is to be mounted,
the cutting insert including a flank face and a rake face continuous with the flank face,
a ridgeline between the flank face and the rake face forming a cutting edge,
the cutting edge including an arc-shaped portion,
a coolant supply path for jetting coolant to the arc-shaped portion being provided in the cutting tool shim, the coolant being supplied from the holder,
the coolant supply path including
a lead-in port for leading the coolant from the holder to the coolant supply path, and
a jetting port for arc-shaped portion for jetting the coolant to the arc-shaped portion,
the jetting port for arc-shaped portion having a curved shape along the arc-shaped portion,
a distance between the jetting port for arc-shaped portion and the arc-shaped portion in a direction perpendicular to the top surface being not less than 2.2 mm and not more than 8.1 mm, wherein
the cutting edge further includes a linear portion continuous with the arc-shaped portion,
the coolant supply path further includes a jetting port for linear portion for jetting the coolant to the linear portion, and
the jetting port for arc-shaped portion is separated from the jetting port for linear portion.

2. The cutting tool shim according to claim 1, wherein the jetting port for arc-shaped portion includes
an outer circumference arc provided beside the arc-shaped portion, and
an inner circumference arc separated from the outer circumference arc and provided beside the arc-shaped portion, when viewed in the direction perpendicular to the top surface.

3. The cutting tool shim according to claim 1, wherein the jetting port for arc-shaped portion is formed by a plurality of slits provided beside the arc-shaped portion, when viewed in the direction perpendicular to the top surface.

4. The cutting tool shim according to claim 1, wherein the top surface includes
a contact portion to come into contact with the cutting insert, and
a protruding portion continuous with the contact portion and separated from the cutting insert, and
the jetting port for arc-shaped portion is open at the protruding portion.

5. The cutting tool shim according to claim 1, wherein the cutting tool shim has a density of not less than 99.0% and not more than 99.9%.

6. The cutting tool shim according to claim 1, wherein a material that constitutes the cutting tool shim has a Rockwell hardness of not less than 20 and not more than 60.

7. The cutting tool shim according to claim 1, wherein a material that constitutes the cutting tool shim is any of a ferrous alloy and a cobalt-chromium alloy.

8. The cutting tool shim according to claim 1, wherein a material that constitutes the cutting tool shim is a polycrystal.

9. The cutting tool shim according to claim 8, wherein the polycrystal has a particle diameter of not less than 4 μm and not more than 10 μm.

10. The cutting tool shim according to claim 1, wherein the distance between the jetting port for arc-shaped portion and the arc-shaped portion in the direction perpendicular to the top surface is not less than 3.0 mm and not more than 6.5 mm.

11. The cutting tool shim according to claim 10, wherein the distance between the jetting port for arc-shaped portion and the arc-shaped portion in the direction perpendicular to the top surface is not less than 3.8 mm and not more than 4.9 mm.

12. A cutting tool comprising:
the cutting tool shim according to claim 1;
the cutting insert; and
the holder,
wherein the cutting tool shim is disposed between the cutting insert and the holder.

* * * * *